(No Model.) 6 Sheets—Sheet 1.

A. WILFERT.
LEVEE OR DITCHING MACHINE.

No. 416,084. Patented Nov. 26, 1889.

ATTEST.
Victor J. Evans.
M. A. Redmond.

INVENTOR.
Andrew Wilfert.
By W. A. Redmond,
Atty.

(No Model.) 6 Sheets—Sheet 2.
A. WILFERT.
LEVEE OR DITCHING MACHINE.

No. 416,084. Patented Nov. 26, 1889.

ATTEST.
Victor J. Evans.
M. A. Redmond.

INVENTOR.
Andreas Wilfert
By W. A. Redmond,
Atty.

(No Model.) 6 Sheets—Sheet 3.

A. WILFERT.
LEVEE OR DITCHING MACHINE.

No. 416,084. Patented Nov. 26, 1889.

ATTEST.
Victor J. Evans.
M. H. Redmond.

INVENTOR.
Andreas Wilfert.
By W. A. Redmond,
Att'y.

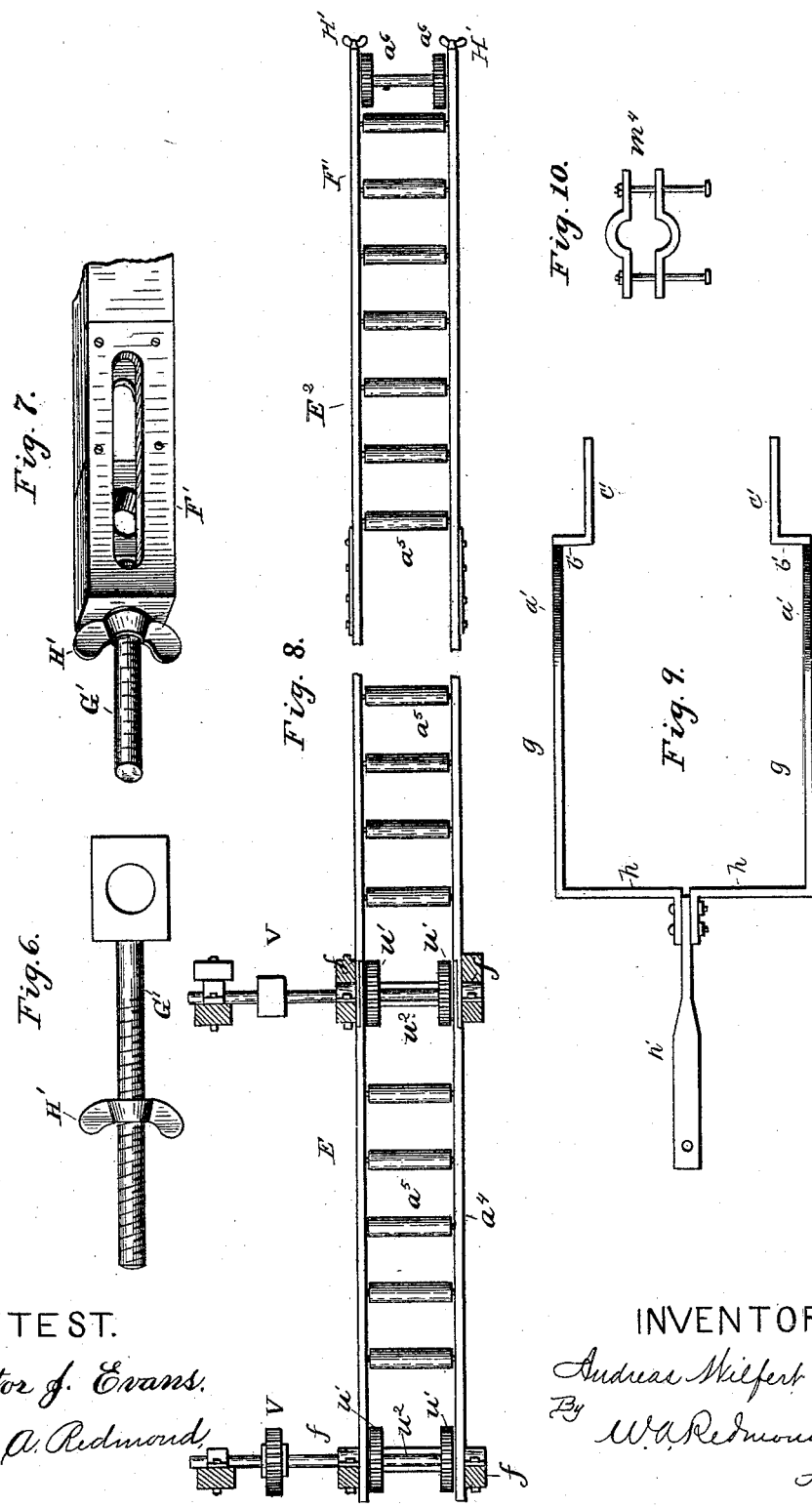

(No Model.) 6 Sheets—Sheet 5.
A. WILFERT.
LEVEE OR DITCHING MACHINE.
No. 416,084. Patented Nov. 26, 1889.
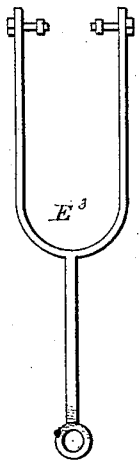
Fig. 11.
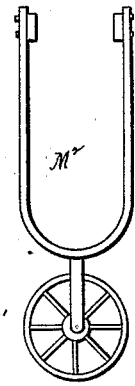
Fig. 12.
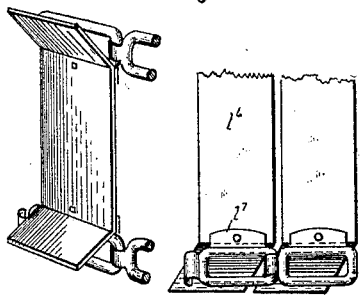
Fig. 13½.
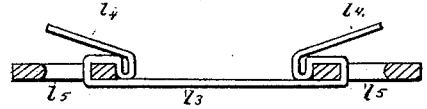
Fig. 13.
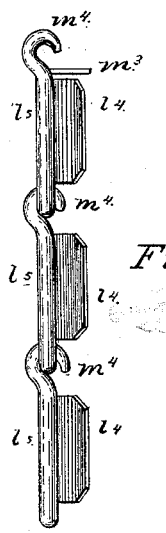
Fig. 15.
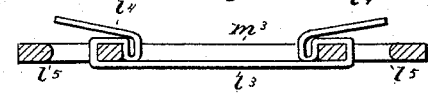
Fig. 14.
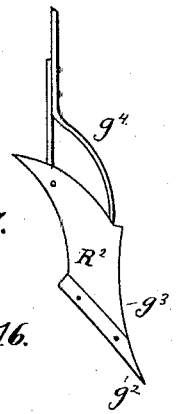
Fig. 17.
Fig. 16.
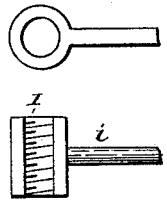
ATTEST.
Victor J. Evans.
M. A. Redmond.
INVENTOR.
Andrew Wilfert.
By W. A. Redmond,
Atty.

(No Model.) 6 Sheets—Sheet 6.

A. WILFERT.
LEVEE OR DITCHING MACHINE.

No. 416,084. Patented Nov. 26, 1889.

ATTEST.
Victor J. Evans.
M. A. Redmond.

INVENTOR.
Andreas Wilfert
By W. A. Redmond
Att'y.

UNITED STATES PATENT OFFICE.

ANDREAS WILFERT, OF RAYNE, LOUISIANA.

LEVEE OR DITCHING MACHINE.

SPECIFICATION forming part of Letters Patent No. 416,084, dated November 26, 1889.

Application filed April 20, 1889. Serial No. 307,965. (No model.)

*To all whom it may concern:*

Be it known that I, ANDREAS WILFERT, a citizen of the United States, residing at Rayne, in the parish of Acadia and State of Louisiana, have invented certain new and useful Improvements in Levee or Ditching Machines; and I do hereby declare the following to be a full, clear, and exact description of the invention, such as will enable others skilled in the art to which it appertains to make and use the same.

This invention relates to a ditch and road making machine of that class in which animal-power is employed to operate or move the same, and it has for its object to provide a machine by which ditches or trenches of varying depths and widths may be excavated with square or angled bottoms and sides, as desired, and which will convey away the dirt to one side as it is excavated, and which may be easily operated by one man and a pair of animals; and it consists of the parts and combinations of parts hereinafter described and claimed.

Figure 1:
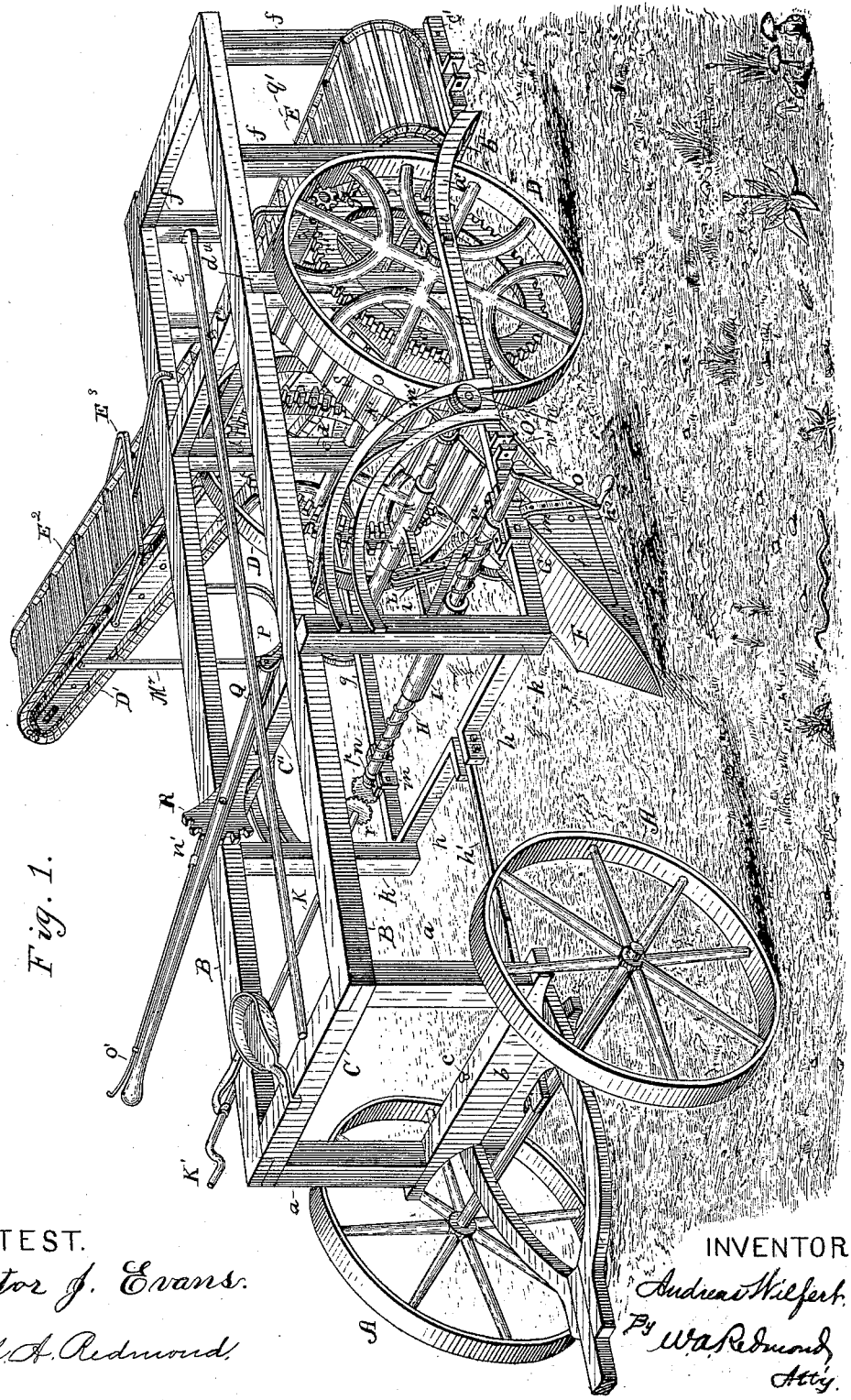
Figure 2:
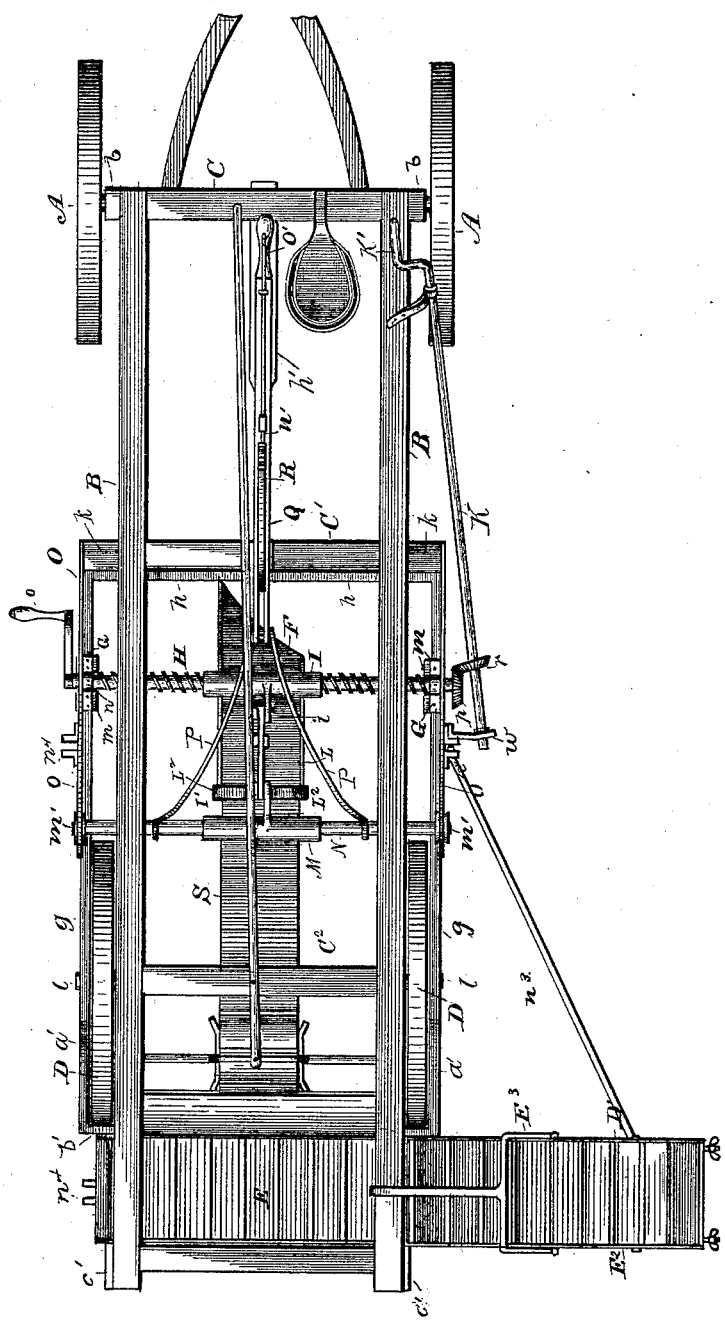
Figure 3:
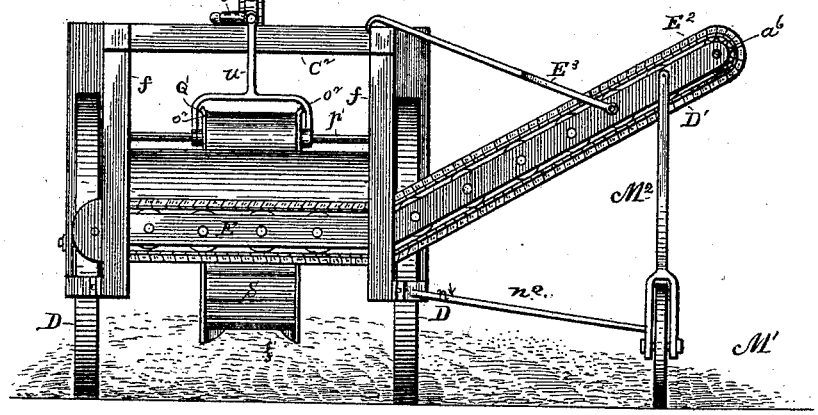
Figure 4:
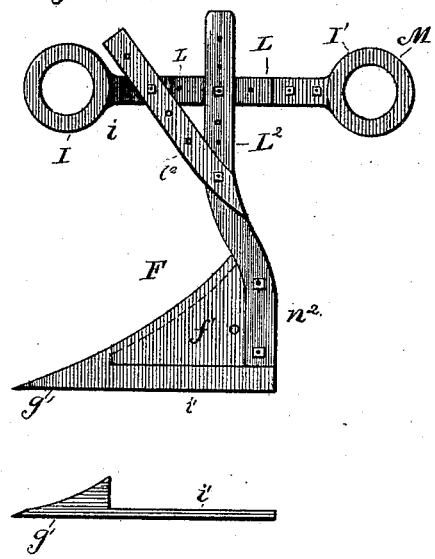
Figure 5:
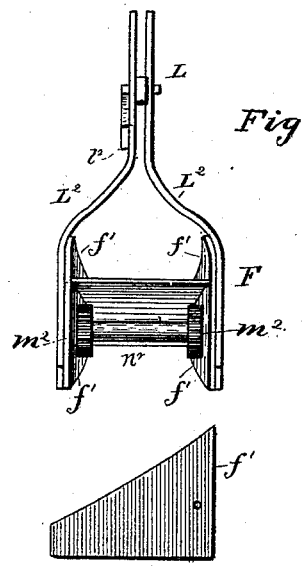
Figure 26:
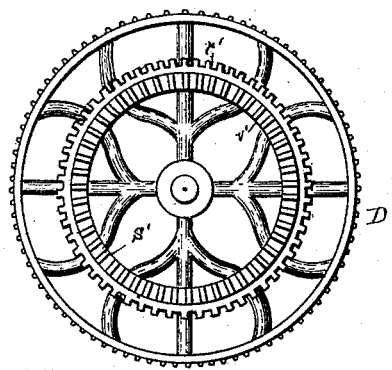
Figure 27:
Figure 21:
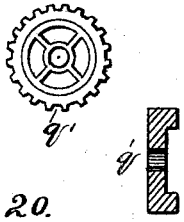
Figure 25:
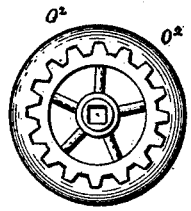
Figure 24:
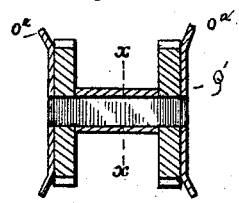
Figure 20:
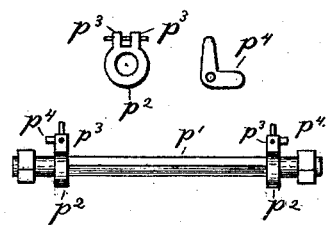
Figure 23:
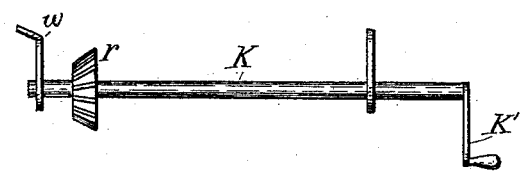
Figure 19:
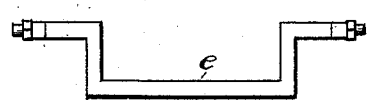
Figure 22:
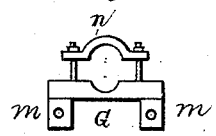
Figure 18:
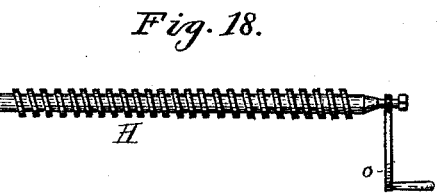

In the accompanying drawings, forming a part of this specification, Figure 1 is a perspective view of my improved machine; Fig. 2, a plan view; Fig. 3, a rear elevation; Fig. 4, a detail side elevation of the plow and point; Fig. 5, a rear elevation of the plow and side view of one of the side plates for the same; Fig. 6, a detail view of the screw-bearing for adjusting the dirt-carrier; Fig. 7, a detail view of the end of one of the side beams of carrier-frame; Fig. 8, a detail view of the carrier-frame; Fig. 9, a plan view of coupling-pole; Fig. 10, a side view of journal box or bearing for one of the cross-shafts; Fig. 11, a view of the lever for raising or lowering the carrier-frame; Fig. 12, a view of the supporting-wheel and attachment for supporting the outer end of carrier-frame; Figs. 13 and 14, views of the carrier or elevator panels. Fig. 13½ is a perspective and a bottom view of a modified form of chain; Fig. 15, a side view of chain for same; Fig. 16, an end view and a section of the screw-threaded armed cylinder for moving the plow; Fig. 17, a view of a plow for cutting square bottoms to trenches; Fig. 18, a view of the adjusting screw rod; Fig. 19, the rear axle; Fig. 20, a view of the rear shaft with clutch or locking device; Fig. 21, a detail view showing a section and side view of cog-wheels for rear shaft; Fig. 22, a detail view of boxing for plow-adjusting screw-rod; Fig. 23, rod and attachments for adjusting screw-rod from seat; Fig. 24, a section of one of the sprocket-wheels for elevator or carrier; Fig. 25, a section on the line $x\,x$, Fig. 24; Fig. 26, a side elevation of one of the rear driving-wheels, and Fig. 27 a side elevation of one of the sprocket-wheels located under the plow.

Similar letters refer to similar parts throughout all the views.

The front part of the machine is supported on an ordinary wagon-truck, having the usual tongue, double-tree, and wheels A, by the standards $a$, which have their lower ends mortised to the bolster $b$ of the truck. The bolster is pivotally secured to the axle by a pin $c$, passing through said bolster and the axle, thus permitting the front wheels to be turned in under the frame in turning the machine.

The frame consists of the side beams B, connected together by the cross-beams C C' C², and is supported at its rear by the standards $d$, which are rigidly secured to the axle $e$. Said axle may be either bent, as shown in Fig. 19, or straight. The side beams B extend beyond the rear wheels D far enough to afford ample space for the operation of the endless carrier E, which is supported at the rear end of the frame by standards $f$, as will be explained hereinafter.

A coupling-pole, a plan view of which is shown in Fig. 9, further connects the machine to the front truck and forms a firm support for and adds great strength to the machine. The coupling-pole consists of the bars $g$, running along each side of the machine and having their front portions $h$ bent or turned inwardly at right angles under the frame, where a pole $h'$ is secured between its ends, said pole having a perforation in its outer end, so that it may be loosely secured to the front truck between the bolster and axle by the pin $c$, washers being interposed between the bolster and axle and pole, so that the latter may turn easily on said pin. At the angle formed by the portions $h$ and side pieces $g$ the coupling-pole is secured to the lower ends of the depending bars $k$ from the side beams B, and near their rear ends they are fitted on the ends of the axle $e$, outside of the wheels D, and there secured by nuts $l$, washers being interposed to prevent friction between the parts. The side pieces $g$ curve downwardly from the axle $e$, as at $a'$, and turn or are bent inwardly after the wheels are passed, as at $b'$, and then straight, as at $c'$, and are bolted to the depending bars $f$, thus furnishing a strong support for the rear end of the machine which carries the endless carrier E.

On the side pieces $g$ are adjustably secured journal-boxes G, (see Fig. 22,) in which the ends of the adjusting screw-rod H have their bearing. These boxes are provided with perforated ears $m$, by which they are bolted to the side pieces, said side pieces being provided with a series of corresponding perforations, whereby the boxes may be moved back and forth and set at any desired position on said pieces. The caps $n$ of the journal-boxes are also easily removable, being merely held by set screws or bolts to the bodies of the boxes. The screw-rod H (see Fig. 18) extends from side to side of the machine, and is provided with a crank-handle $o$ on one end, and with a beveled pinion $p$ on the other, which is in mesh with a like pinion $r$, secured near the lower end of an inclined shaft K, (see Fig. 23,) having its bearing in a lug on the frame of the machine, near its upper end, and its lower end working in a suitable bearing $w$, supported by one of the side pieces $g$ of the coupling-pole. The upper end of rod or shaft K carries a crank-handle K' within easy reach of the driver or operator, who occupies a seat supported by the cross-beam C.

Fitted to the screw-rod H is an elongated nut or cylinder I, having interior screw-threads, as shown in Fig. 16, which fit the threads of rod H. An arm $i$ projects from about the center of the cylinder I, at right angles thereto, and has its end secured to the plow-beam L.

M represents a cylinder having an arm I' projecting therefrom similar to arm $i$, and which is also secured to the plow-beam L. This cylinder M is smooth-bored and is fitted to a shaft N, which extends across the machine, and has its ends working in semicircular slots N', formed by the curved bars O, which are secured to the side pieces $g$ at one end and to the bars $k$ at their other ends. As shown, the curved bars O form the slot by being laid one over or above the other at a slight distance apart; but it will be understood that one curved piece or bar having the slot formed therein may be used, if found convenient or desirable. The shaft N is provided with friction wheels or rollers $m'$ at each end, to reduce the friction between the parts and enable the shaft N to move easily in the slot.

To the shaft N, near its ends, are attached the ends of a spreading or forked lever P, the other end of said lever being pivotally attached to the short arm of a lever Q, which is slotted so as to fit over a sector-block R, secured to the cross-beam C', and to which said lever Q is pivoted. A spring-actuated dog $n'$, connected to a thumb-lever $o'$, working in guides secured to lever Q, engages the notches of the sector-block to hold the lever, and, through its attachments, the plow, in any position to which it may be raised by means of said lever Q. Thus, by raising or depressing the lever Q the lever P and shaft N are raised or lowered, and with them the plow, as the same is connected to said shaft through the cylinder M and its arm I', the ends of the shaft sliding in the slot N', formed by the bars O, and at the same time the plow retains its set horizontal position no matter to what height it is raised or lowered. By turning the crank $o$, which is secured on the end of screw-rod H, the interiorly-threaded cylinder I may be moved along said rod either to the right or left, and thus, through its connecting-arm $i$, move the plow in the same direction, and as cylinder M is smooth-bored, and also connected to the plow-beam, it moves easily on its shaft with the plow. The movement of the screw-rod H may be accomplished by the driver from his seat on the machine by means of shaft or rod K, upon turning which the pinion $r$, secured on said shaft near its lower end, in mesh with the pinion $p$ on the screw-rod, will rotate said rod, and thus move the plow, as above described. The lever Q is also conveniently located within reach of the driver from his seat, whereby he may raise or lower the plow, as desired.

F represents the main or ditching plow. As clearly shown in Figs. 1, 4, and 5, the plow inclines on its upper surface or body portion and is open at its rear, so that the excavated dirt may be forced up said inclined surface while the machine is in operation, and over the rear end onto the endless elevator S. The plow-stock $L^2$ is formed in two pieces, having their lower ends bolted to the sides of the plow and then bent toward each other, as shown in Fig. 5, and then upwardly, and between these pieces is adjustably bolted the horizontal beam L, said stock being perforated so that the beam may be raised or lowered, as desired. From the stock an arm $l^2$ projects, which is perforated so that it may be adjustably bolted to arm $i$ of cylinder I, in order to better brace the plow-stock. On each side of the plow side plates $f'$ are bolted, which have their upper edges inclined forward and which prevent the dirt escaping over the sides of the plow on its passage to the elevator, and also extend down below the lower surface of the plow and form a guide for the elevator S, which works between said plates, as will be described. The plow-point $g'$ is provided with an arm $i'$, by which it may be bolted to either side of the plow, as the cutting requires.

The plow above described cannot cut a square ditch; so when such cut is desired I use the plow R². (Shown in Fig. 17.) Plow R² is an ordinary plow having a point $g^2$ and share $g^3$, which curves back and is provided with an angle-stock $g^4$, whereby it may be bolted to plow-beam L, and by running the plow along one side of the ditch and back on the other square sides may be cut to the ditch, the dirt being thrown to the center, from whence it is removed by the plow F when replaced in position.

The elevators S and E consist of the panels $l^3$, as clearly shown in Figs. 13 and 14, which have their ends $l^4$ passed through the square links $l^5$ of the sprocket-chain and bent over inward so as to secure the panels to the links, and then bent outward at an obtuse angle so that said ends will cover the link-opening and prevent the dirt falling over the sides of the chain. At regular intervals apart one of the panels is bent longitudinally, as at $m^3$, to prevent the dirt escaping or sliding backward while being elevated. The links are each provided or formed with a hook $m^4$ at one end, and adapted to hook over the link next to it, and thus form the chain.

In Fig. 13½ I show another form of elevator-chain, in which the panels $l^6$ are riveted to plates $l^7$ projecting from the links, and have their ends bent upward, as shown, to prevent the dirt escaping through the links. Elevator S works over two sprocket-wheels $m^2$, loosely mounted on a shaft $n^2$, located beneath the plow and secured in the side plates $f'$ thereof, and passes up to and over a sprocket-wheel Q', mounted loosely on a smooth square shaft $p'$, (see Fig. 20,) having its bearings in journal-boxes $m^4$, (see Fig. 10,) secured to the short bars $q$, connecting the standards $d$ and $f$ on each side of the machine, the ends of the shaft $p'$ being, of course, round, so as to work easily in their boxes, and carrying pinions $q'$, which mesh with the teeth $r'$, formed on the periphery of the wheels $s'$, which are secured to the rear wheels D of the machine, as shown in Fig. 26, so that the rotation of the wheels D will rotate the shaft $p'$ and move the endless elevator S, thus carrying the earth up and dumping it on the inclined platform which extends across the machine immediately at the rear of the elevator S, from which it slides onto the cross elevator or carrier E. The sprocket-wheel Q' is double—that is, two wheels are connected together by a short central block having a square opening therethrough—and fits the shaft $p'$ loosely, so that it may be moved along said shaft by means of the lever $t'$, which is pivoted to the cross-beam C² and carries the forked lever $u$, which fits over the sprocket-wheel Q'. By moving the lever $t'$ the sprocket-wheel Q' may be moved along the shaft to correspond to the position of the sprocket-wheels $m'$, whose positions vary with the adjustment of the plow. The sprocket-wheel Q' is provided with inclined flanges $o^2$, as shown in Figs. 24 and 25, whereby the elevator S is prevented slipping off the same. The pinions $q'$ are mounted loosely on shaft $p'$, and turn freely thereon when the machine is not in operation; but when in operation the pinions $q'$ are held so as to rotate the shaft by means of the collars $p^2$, which are rigidly attached to shaft $p'$, near the pinion, and are provided with two lugs $p^3$, between which is hung the angle-keys $p^4$, as shown in Fig. 20. The keys $p^4$, being dropped into one of the spaces between the spokes of the pinions $q'$, lock the same firmly to the shaft, so that it will rotate the shaft and move the elevator S. One of the pinions $q'$ is shown in section and also in full face in Fig. 21. The rear elevator E runs on sprocket-wheels $u'$, which are secured to shafts $u^2$, journaled in bearings secured to the bars $f$, and extends across the machine. The shafts $u^2$ of the sprocket-wheels $u'$ extend inwardly, and one of which carries near its inner end a pinion V, which is in mesh with the teeth $v'$, formed on the side of the left wheel $s'$, and rear shaft $u^2$ is thereby rotated when the machine is in motion and the elevator caused to move. Both of the shafts $u^2$ may be provided with pinions V, if desired, but ordinarily only one is required. The shafts $u^2$ of the sprocket-wheels $u'$ are also provided with locking-collars $p^2$, as shown in Fig. 20, which operate to hold the loosely-mounted pinions V rigid with their shafts $u^2$.

As shown in Fig. 8, E represents the rear elevator-frame, consisting of the two bars $a^4$, secured together by the shafts $u^2$, and a series of loose rollers $a^5$ are suitably secured between said bars, so that the elevator may run easily thereon. To this frame is connected a movable frame E², which is also provided with loose rollers $a^5$, and which can be adjusted vertically by means of the hook E³, which is connected to the frame E², and may be hooked over one of the side beams B. At its outer end the elevator E² carries sprocket-wheels $a^6$, similar to wheels $u'$, which are adjustable, so as to tighten or loosen the sprocket-chain D' of the rear elevator E.

As shown in Figs. 6 and 7, the bars of the frame E² are slotted, and have bolted to them slotted irons F'. A screw-bolt G', having a perforated head, is fitted to said slot, and its screw end projects through an opening in the end of the slotted iron F'. A thumb-nut H' is fitted to the screw-bolt, by which it may be moved back and forth in the slot, and thus carry with it the sprocket-wheels $a^6$, which are journaled in the perforated head, thus tightening or loosening the elevator-chain.

The elevator-frame is made in sections, and as many as desired may be used according to the distance it is desired to carry the earth. The elevator-frame E² may be used on either side of the machine by simply removing one of the shafts $u^2$, fitting the end of the elevator in place, and then passing the shaft into place again through said end. At the outer end of elevator-frame E² a wheel M' is supported by a frame M², which is secured to said frame E², so that the elevator-frame will be supported when in operation. The wheel is braced by rods N² and N³, extending from lugs N⁴ on the side pieces $g$ of the coupling-pole and from the rear end of the machine-frame, respectively, and having their other ends suitably attached to either end of the shaft-axle on which the wheel works.

Having thus described my invention, what I claim as new, and desire to secure by Letters Patent, is—

1. The combination, in a ditching-machine, of a suitable frame, an adjusting screw-rod extending across said frame, an interiorly-threaded tube working on said rod, a plow having its beam adjustably connected with said tube, curved slotted bars secured on each side of the machine, a shaft extending across the frame and having its ends working in the slotted bars, a smooth-bored tube mounted on said shaft and adjustably connected with plow-beams, and a lever for raising or lowering said shaft, substantially as described.

2. The combination, in a ditching-machine, of a suitable main frame, the rear wheels having the cog-wheels secured thereto, an adjustably-supported plow having side plates, sprocket-wheels journaled in said side plates, a square shaft journaled to said main frame, the double sprocket-wheel loosely mounted on said shaft, the pinions loosely mounted on the ends of said shaft and meshing with the cog-wheels on the rear wheels, the collars having lugs rigidly secured to said shaft, the angle-keys pivoted between said lugs, an endless carrier connecting the sprocket-wheels under the plow with the double sprocket-wheel, and a lever for moving said double sprocket-wheel, substantially as described.

3. The combination, in a ditching-machine, of a suitable frame, supporting-wheels therefor, a coupling-pole supported from said frame and the rear axle, the screw-rod having its bearing on said pole, the curved slotted bars secured to said pole and frame, the interiorly-threaded tube having an arm mounted on said screw-rod, the cross-shaft working in said slotted bars, the smooth-bored tube having an arm mounted on said shaft, the plow having a horizontal beam adjustably connected to its stock, means for moving the tubes along the screw-rod and shaft, a sector-block secured to the frame, a lever pivoted to said block, and a spreading-lever secured to said lever and having its end secured to the cross-shaft, substantially as described.

4. The combination, in a portable ditching-machine, of the main frame, the front supporting-wheels, the rear wheels having wheels provided with peripheral and side cogs, the screw-rod, the interiorly-threaded tube mounted on said screw-rod, the arm projecting at right angles from said tube, the plow having a horizontal beam secured to said arm, the curved slotted bars, the cross-shaft having friction-wheels working in said curved bars, the tube mounted on said shaft and connected to the plow-beam, the lever for adjusting said shaft, the sprocket-wheels journaled in the side plates of the plow, the square shaft carrying loose pinions on its ends, means for locking said pinions to the shaft, the double sprocket-wheel loosely mounted on the shaft, an endless elevator connecting said double sprocket-wheel with the sprocket-wheels under the plow, the lever for moving said double wheel, a platform, a cross endless elevator, and the shafts having pinions meshing with the side cogs on the driving-wheels, substantially as described.

5. The hereinbefore-described plow for ditching-machines having the inclined surface, the side plates extending above and below said surface, the perforated stock consisting of two bars secured to the rear end of the plow and bent toward each other above it, the horizontal beam adjustably secured to said stock, a brace iron or bar connecting the stock and beam, and a removable point bolted to one of the side plates, substantially as described.

6. An endless elevator for ditching-machines, consisting of the sprocket-chain and the panels having their ends passed through the links of said chain and bent inwardly and then outwardly to cover the link-openings, and some of said panels bent longitudinally, substantially as described.

7. The combination, in a ditching-machine, of the sectional frame having rollers journaled therein, the side bars of the outer section having slots formed in their ends, the slotted irons secured to said ends, the screw-bolts having perforated heads fitted in said slots, a shaft journaled in the perforated head, the sprocket-wheels mounted on said shaft, the sprocket-wheels having flanges journaled at the inner end of the frame, the thumb-nut, and an endless elevator working over the sprocket-wheels, substantially as described.

8. The combination, in a ditching-machine, of the frame, the wheels supporting the same, the coupling-pole, the screw-rod having its ends journaled in boxes secured to said pole, the bevel-pinion secured to one end of said rod, the shaft or rod having a crank-handle at one end and bevel-pinion at the other journaled to the frame and coupling-pole, the interiorly-threaded tube having an arm, the plow having a horizontal beam, the cross-shaft, the tube having an arm mounted on said shaft, the curved slotted bars, the endless carrier S, the square cross-shaft, the double sprocket-wheel having flanges mounted loosely on said shaft, the pinions mounted loosely on the ends of said shaft, means for locking said pinions to said shaft, the wheels having side and peripheral cogs secured to the rear driving-wheels, the shafts $u^2$, carrying pinions in mesh with the side cogs, the double sprocket-wheels having flanges mounted on said shafts, the endless elevator-frame carrying the sprocket-wheels at one end, the endless elevator running on said wheels, the frame $M^2$, the wheel $M'$, the brace-rods $N^2$ $N^3$, and the hook $E^3$, substantially as described.

In testimony whereof I affix my signature in presence of two witnesses.

ANDREAS WILFERT.

Witnesses:
  WILL. C. CHEVIS,
  WILLIAM W. OLMSTED.